US011126520B2

(12) United States Patent
Acheson et al.

(10) Patent No.: US 11,126,520 B2
(45) Date of Patent: Sep. 21, 2021

(54) SKEW DETECTOR FOR DATA STORAGE SYSTEM

(71) Applicant: Amazon Technologies, Inc., Seattle, WA (US)

(72) Inventors: Alazel Acheson, Redmond, WA (US); Meng Hu, Nanjing (CN); Nauman Zubaid Khan, Redmond, WA (US); Mai-Lan Tomsen Bukovec, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 203 days.

(21) Appl. No.: 16/530,650

(22) Filed: Aug. 2, 2019

(65) Prior Publication Data
US 2019/0354455 A1 Nov. 21, 2019

Related U.S. Application Data

(62) Division of application No. 14/307,377, filed on Jun. 17, 2014, now Pat. No. 10,372,574.

(51) Int. Cl.
*G06F 16/00* (2019.01)
*G06F 11/267* (2006.01)
(Continued)

(52) U.S. Cl.
CPC ............ *G06F 11/267* (2013.01); *G06F 3/00* (2013.01); *G06F 16/23* (2019.01); *G06F 16/2386* (2019.01)

(58) Field of Classification Search
CPC ............................ G06F 11/267; G06F 16/2386
See application file for complete search history.

(56) References Cited

U.S. PATENT DOCUMENTS 9,031,994 B1 * 5/2015 Cao ...................... G06F 16/278
707/798
9,384,227 B1 * 7/2016 Xiao ..................... G06F 16/278
(Continued)

OTHER PUBLICATIONS

Encyclopedia of Database Systems, p. 634-35, Springer, 2009, retrieved Jul. 7, 2017, retrievable at <URL: https://link.springer.com/referenceworkentry/10.1007%2F978-0-387-39940-9_1088>.
(Continued)

*Primary Examiner* — Tyler J Torgrimson
(74) *Attorney, Agent, or Firm* — Davis Wright Tremaine LLP

(57) ABSTRACT

A computing resource service provider may store user data in a distributed data storage system. The distributed data storage system may contain one or more storage partitions configured to store based at least in part on prefixes of keys contained in a key-value store, where the size of the keys may vary. The one or more storage partitions may track requests to access data where the requests include a key such that the data may be located by the service provider based at least in part on the key. When a request is received a skew value associated with the key included in the request may be determined. The skew value may be determined based at least in part on the ratio of rate estimators, where the rate estimators represent a weighted average of the movement of the keys in a key space. If the skew value exceeds a threshold the service provider may take mitigating action.

20 Claims, 8 Drawing Sheets

(51) Int. Cl.
*G06F 3/00* (2006.01)
*G06F 16/23* (2019.01)

(56) References Cited

U.S. PATENT DOCUMENTS

| | | | | |
|---|---|---|---|---|
| 9,607,019 B1* | 3/2017 | Swift | ............... | G06F 16/2255 |
| 2011/0313999 A1* | 12/2011 | Bruno | ............... | G06F 16/24542 |
| | | | | 707/718 |
| 2013/0232133 A1* | 9/2013 | Al-Omari | ........... | G06F 16/2456 |
| | | | | 707/714 |
| 2014/0195542 A1* | 7/2014 | Larson | .............. | G06F 16/24554 |
| | | | | 707/741 |
| 2016/0110391 A1* | 4/2016 | Korycki | .............. | G06F 16/2228 |
| | | | | 707/741 |

OTHER PUBLICATIONS

Walton et al., "A Taxonomy and Performance Model of Data Skew Effects in Parallel Joins," Proceedings of the 17th International Conference on Very Large Data Bases, Sep. 1991, 12 pages.
Walton, "Four Types of Data Skew and their Effect on Parallel Join Performance," Department of Computer Sciences, University of Texas at Austin, May 1990, 42 pages.

* cited by examiner

SKEW DETECTOR FOR DATA STORAGE SYSTEM

CROSS REFERENCE TO RELATED APPLICATION

This application is a continuation of U.S. patent application Ser. No. 14/307,377, filed Jun. 17, 2014, entitled "SKEW DETECTOR FOR DATA STORAGE SYSTEM," the disclosure of which is herein incorporated by reference in its entirety.

BACKGROUND

The use of network computing and storage has proliferated in recent years. The resources for network computing and storage are often provided by computing resource providers who leverage large-scale networks of computers, servers and storage drives to enable clients, including content providers, online merchants and the like, to host and execute a variety of applications and web services. Content providers and online merchants, who traditionally used on-site servers and storage equipment to host their websites and store and stream content to their customers, often forego on-site hosting and storage and turn to using the resources of the computing resource providers. The usage of network computing allows content providers and online merchants, among others, to efficiently and adaptively satisfy their computing needs, whereby the computing and storage resources used by the content providers and online merchants are added or removed from a large pool provided by a computing resource provider as needed and depending on their needs. The computing resource service providers may respond to requests for computing and storage reactively by adding or removing resources assigned to the content providers, online merchants and others.

BRIEF DESCRIPTION OF THE DRAWINGS

Various embodiments in accordance with the present disclosure will be described with reference to the drawings, in which.

DETAILED DESCRIPTION

Figure 1:
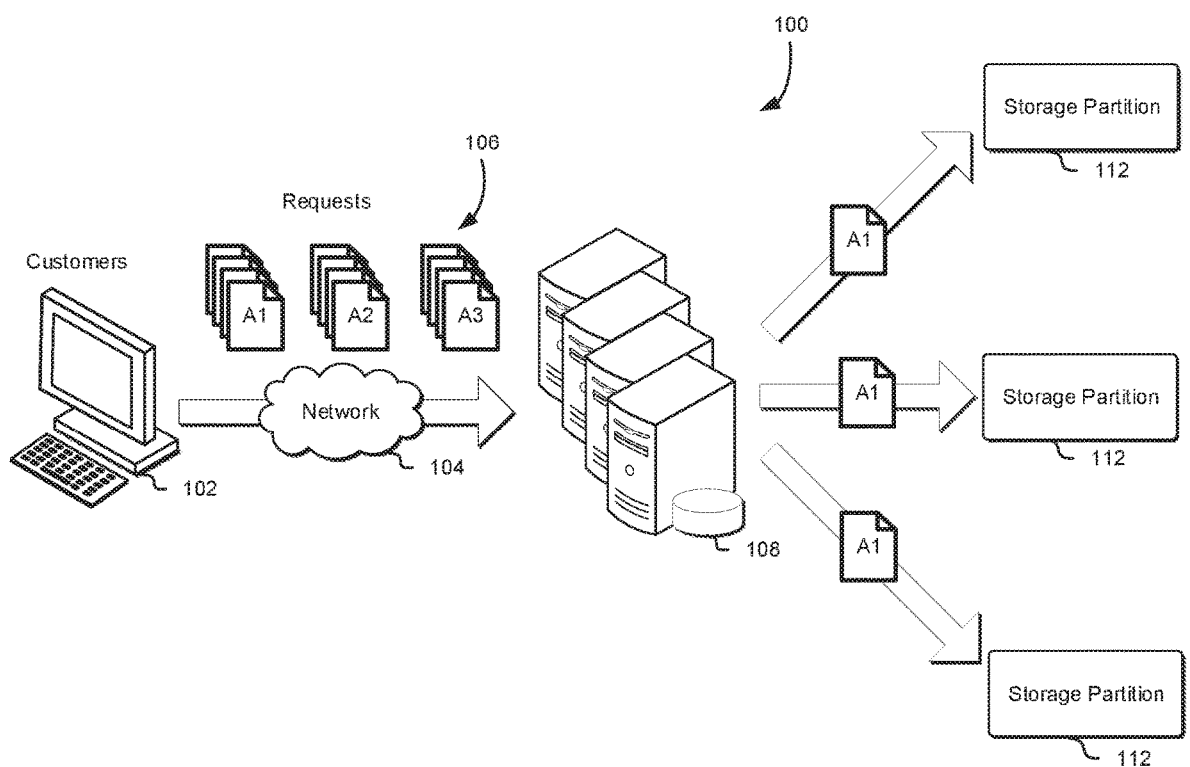
FIG. 1 is an environment illustrating request processing by a data storage service in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to improvements to data storage systems including determining a skew based at least in part on request activity and performing one or more mitigating actions if the skew is above a threshold value. Organizations and individuals may use computing resources of a computing resource service provider (also referred to as a service provider) in order to store data remotely. The organizations and individuals may interact with the data stored remotely, by the service provider, through appropriately configured requests such as application programming interface (API) calls configured with information identifying the data to be interacted with. The skew may be value associated with one or more events, such as a request to interact with data stored by the service provider, where new values are included in calculation of the skew such that skew represents an aggregated change in position of the values over time. The skew, therefore, may be a value indicative of a set of values moving in a particular direction. For example, a set of time stamps may have a skew value indicating the set is moving in a particular direction (e.g., forward in time) in one dimension.

The skew value may be determined based at least in part on a distance function and two or more rate estimators. The distance function may be a function that takes two values and returns a distance value indicating the amount of domain space between the two values and a direction. The distance function may have a precision as well as a well-defined domain. An example of the distance function includes $f(x, y)=(x-y)$ where the sign of the value of the result indicates directions (e.g., negative or positive direction in one-dimensional space) and the magnitude indicates the distance between the two values x and y, each being a key or a function thereof (e.g., a portion of a key) or otherwise based at least in part on a key. The two or more rate estimators may provide an exponential moving average for a set of time-based values which may be used to calculate the skew. There may be two rate estimators for each dimension, one rate estimator for each direction in a particular dimension. For example, in one-dimensional space there may be two rate estimators, a positive rate estimator and a negative rate estimator. One or more vectors may be used to represent the distance value such that the distance value may have a direction as well as a magnitude. The vectors may be used to determine the position of one point in space relative to another. For example, the vectors may be used to determine the skew value or the position of the new value relative to the previous value. In higher-dimensional space multiple vectors in the space may be used to determine the skew value for the higher-dimensional space. The magnitude of the distance obtained from the distance function may be added to the particular rate estimator associated with the direction of the value. For example, the distance function may return a negative value, the magnitude of the value may be added to the negative rate estimator. Furthermore, the rate estimators may be configured to decay at an exponential rate over an interval until a particular value is reached. The skew value may be determined by obtaining the ratio of the rate estimators. A ratio of one may indicate that no skew is present whereas a ratio of greater than one may indicate a relative size of the skew. Determining the skew may include any mechanism for defining a relationship between a set of values based at least in part on two functions, a first function measuring a rate of change in one directions and a second function measuring a rate of change in another direction.

The service provider may track requests in order to determine activity associated with data stored remotely by the service provider and adjust computing resources assigned to the data according to activity. The service provider may operate a data storage service responsible for storing data on behalf of customers of the service provider. The data storage service may use keys to locate and store data on behalf of the customer. For example, the data storage service may concatenate a key of a uniform resource locator (URL) associated with the data with a user generated key, such as a location name, in order to track the location of the data. The key or a portion of the key may then be associated with a particular storage partition where the data is stored. The storage partition (also referred to simply as partitions) may contain one or more data stores configured to store customer data and track requests to interact with data stored within the partition. The requests to interact with data may specify a key indicating the location of the data within the data storage service, such as a particular partition of the data storage service. A request-processing subsystem may be responsible for receiving customer requests and determining the particular partition associated with the request.

The partitions may be configured to track requests based at least in part on the key included or otherwise specified in the request and determining a skew value for a set of keys. The requests may be tracked based at least in part on a prefix of the keys. If the partition receives a certain number of requests containing a particular prefix over an interval, the data storage service may determine to split the prefix and generate a new partition responsible for processing requests associated with the split prefix. However, if the skew value is above a threshold it may indicate that the keys and associated prefixes are moving in a particular direction. Therefore the frequency that the prefixes are occurring in requests may reduce over time and may not necessitate a new partition in order to process incoming requests. For example, a key included in one or more requests may include a timestamp corresponding to the time the request was generated, the one or more requests may be tracked based at least in part on a prefix of the key (e.g., an hour indicated by the timestamp). The particular frequency of the prefix may indicate to the data storage service that additional partitions may be required to process the volume of requests including the prefix. The data storage service may then first determine a skew value associated with the request before splitting the prefix in order to avoid unnecessary re-partitioning due to the predicted change in the prefix (e.g., the change in time).

The partitions may maintain a collection of prefixes and maintain or otherwise have an associated counter indicating the number of requests associated with each prefix. Furthermore, the partitions may maintain two or more rate estimators for each dimension of the key space as well as the last key received. The rate estimators and the counters associated with the prefixes may be configured to decay over time. For example, the rate estimators may be subject to exponential decay so that the counter decreases at a rate proportional to the rate estimators' current value. For each new request received, the partition may obtain a new key from the request to determine a distance between the last key and the new key based at least in part on a distance function. The partition may then add the magnitude of the distance to the rate estimator corresponding to the direction indicated by the distance function. Furthermore, the partition may determine a decay value for at least one of the rate estimators and adjust the rate estimator according to the decay. For example, the partition may add the magnitude of the distance to the rate estimator, determine a decay value based at least in part on the last interaction the partition had with the rate estimator and reduce the rate estimator by the decay value. A skew detector may be included in the partition in order to maintain the last key and the two or more rate estimations. Furthermore, the skew detector may calculate the skew on demand. For example, before the partition or other system of the service provider may determine to split a prefix and provision a new partition, the partition or other system of the service provider may request a skew value from the skew detector.

Partitions may be responsible for multiple prefixes. For example, a partition may contain data associated with prefixes "ABC" and "DEF." The request received from the customers may include requests to read or write data stored by the data storage service. The customers of the service provider may define the key used for storing the customers' data. A tracking service included in the partition may then determine which prefixes associated with the key are being received more often than the other prefixes. The tracking service along with the skew detector may enable the data storage service to take mitigating actions based at least in part on the user-defined keys, such as increasing the amount of computing resources configured to process the requests. For example, if the skew value indicates a large skew in the set of keys, the data storage service may provision additional partitions configured to process keys in the direction indicated by the skew value.

The skew detector may be configured to determine the skew based at least in part on a portion of the key. As described above, the data storage service may cause a request with identical prefixes to be processed by a particular partition. Therefore, the skew detector may be configured to determine the skew based at least in part on a portion of the key not including the prefix. Furthermore, the skew detector may maintain information useable for determining the skew in the memory of a host computer system executing the partition. Additionally, the partitions may track the prefixes in the memory of the host computer system executing the partition and by limiting the number of prefixes that may be tracked the data storage service may place an upper bound on the amount of resources required to track prefixes. Furthermore, the data storage service may be configured to direct requests to the partition responsible for the longest prefix that matches the key. For example, a request including the key "ABCD1234" may be directed to the partition associated with prefix "ABCD1" rather than the partition associated with the prefix "A" because the prefix "ABCD1" is the longer prefix that still matches the key.

FIG. 1 illustrates an example environment 100 where one or more computer systems running within a service provider environment, as well as the associated code running thereon, may operate a remote data storage service configured to store data in a storage partition 112 and fulfill requests to interact with stored data based at least in part on a key (also referred to as an identifier) included in the request where a prefix of the key is associated with a particular storage partition containing the requested data. Although the term prefix is used throughout for illustrative purposes, any subsequence of an identifier including at least a subset of the bits and/or characters of the identifier may be used in accordance with the present disclosure. For example, a suffix of the key may be used to track requests and determine potential split points. Furthermore, any deterministic algorithm may be used for generating an identifier including at least a subset of the bit of the key. The identifiers of the data objects may be sequences and various subsequences of the identifiers may be tracked such as prefixes, suffixes, subsequences starting after the nth character or bit or subsequences starting n characters or bits from the end of the identifier. The identifiers of the data objects may be tracked or otherwise monitored for a variety of purposes in accordance with the present disclosure. For example, the identifiers may be tracked in order to determine a skew value for a set of identifiers. In another example, the identifiers may be tracked in order to determine potential split points for one or more identifiers enabling the data storage service to more efficiently process requests including the identifiers once split.

A customer 102 (also referred to as a user) may connect to a data storage server 108 through a computer system client device and may initiate connection with and/or interaction with one or more storage partitions 112 associated with the data storage server 108. For example, the user may submit one or more requests 106 to interact with data stored in the data storage partition associated with the data storage server 108 operated by the service provider. The requests 106 may be any request to interact with data stored by the service provider, such as an API call, service call, a hypertext transfer protocol (HTTP) request or similar request capable of enabling interaction with data stored remotely. The interaction may include a variety of interactions such as writing data to storage, reading data from storage, modifying data stored remotely or any other interaction performable on data stored by the service provider. Furthermore, the requests may include a key from a key space with an identifiable pattern such as time, Internet Protocol (IP) address, user identification numbers and/or customer identification numbers. For example, a customer 102 may generate user identification numbers sequentially and may use the user identification numbers as a key in one or more requests to store data associated with the user identification numbers with the service provider. The key space may include the set of all possible keys which may be generated from the collection of elements comprising the keys. For example, if the elements of the key comprise A through F and 1 through 9, the key space includes the set of all possible keys that may be generated using the elements of the key A through F and 1 through 9.

The customer 102 may generate a number of requests during an initial set-up of a new user including the user identification number. As illustrated in FIG. 1, the user identification numbers "A1," "A2," and "A3" may have a number of requests associated with the initial set-up of the user identification numbers and/or corresponding user which may decrease over time. The data storage server 108 may be configured such that the frequency of requests with a particular key, for example user identification number "A1," may cause the data storage service to distribute processing of requests including the key over a plurality of storage partitions 112. A skew detector may enable the data storage server 108 to predict a direction and rate of change in the user-defined keys included in the requests 106.

The customer 102 may include organizations or entities of an organization. The term organization, unless otherwise clear from context, is intended to be read in the broad sense to imply a set of principals organized in some manner. The customer 102 may submit the request 106 through an interface such as a management console executed by the service provider and provided to the user 102 as a website. The data storage server 108 and one or more storage partitions 112 may be operating within a service provider. In some embodiments, the computing resource service provider may provide a distributed, virtualized and/or datacenter environment within which one or more applications, processes, services, virtual machines and/or other such computer system entities may be executed. The data storage server 108 may be a computer system configured to store information on behalf of the customer 102 and enable the user to interact with the data stored through appropriately configured requests 106. For example, the data storage server 108 may be a computer server located in a data center including one or more attached storage devices, such as a hard disk drive.

The customer 102 may submit requests 106 over a connection, the connection may be established over a network 104. The network 104 may be any suitable network such as the Internet, a local area network, wide area network or any other suitable communications network and/or other networks noted herein and/or combinations of networks. The requests 106 may be received by the data storage server 108 or interface of the data storage server directly or may be forwarded to the data storage server 108 by one or more services or servers of the service provider. For example, the request 106 may be received by a request-processing subsystem, described in greater detail below in connection with FIG. 3, operated by the service provider and forwarded to one or more data storage servers 108. The request-processing subsystem may determine one or more data storage servers 108 capable of fulfilling the request 106 and forwarding the request 106, based at least in part on the determination.

Once the requests 106 have been received at the data storage server 108, the data storage server 108 may determine the storage partition responsible for maintaining the requested data on behalf of the customer 102. The data storage server 108 may determine the storage partition responsible for maintaining the requested data based at least in part on a prefix of a key included in the request. As described above, the customer may define the key and include the key in the request to enable the location of the requested data. For example, the key may include a URL of the requested data concatenated with a file name or other information assigned to the data by the user. Furthermore, the key may include a representation of information configured to locate the data such as a hash. The data storage server 108 may be components of the data storage service operated by the service provider. The data storage server 108 may include one or more storage devices such as hard disk drives, solid-state drives, network storage devices, RAM, floppy disk drives, optical disk drives, tape drives or any other device suitable for storing data. The data storage servers 108 may store data on behalf of the customer 102 and may also provide data to the customer 102 and/or one or more other customers. For example, the one or more data servers 108 may provide data for a website operated by the customer 102 using one or more other resources of the service provider.

Figure 2:
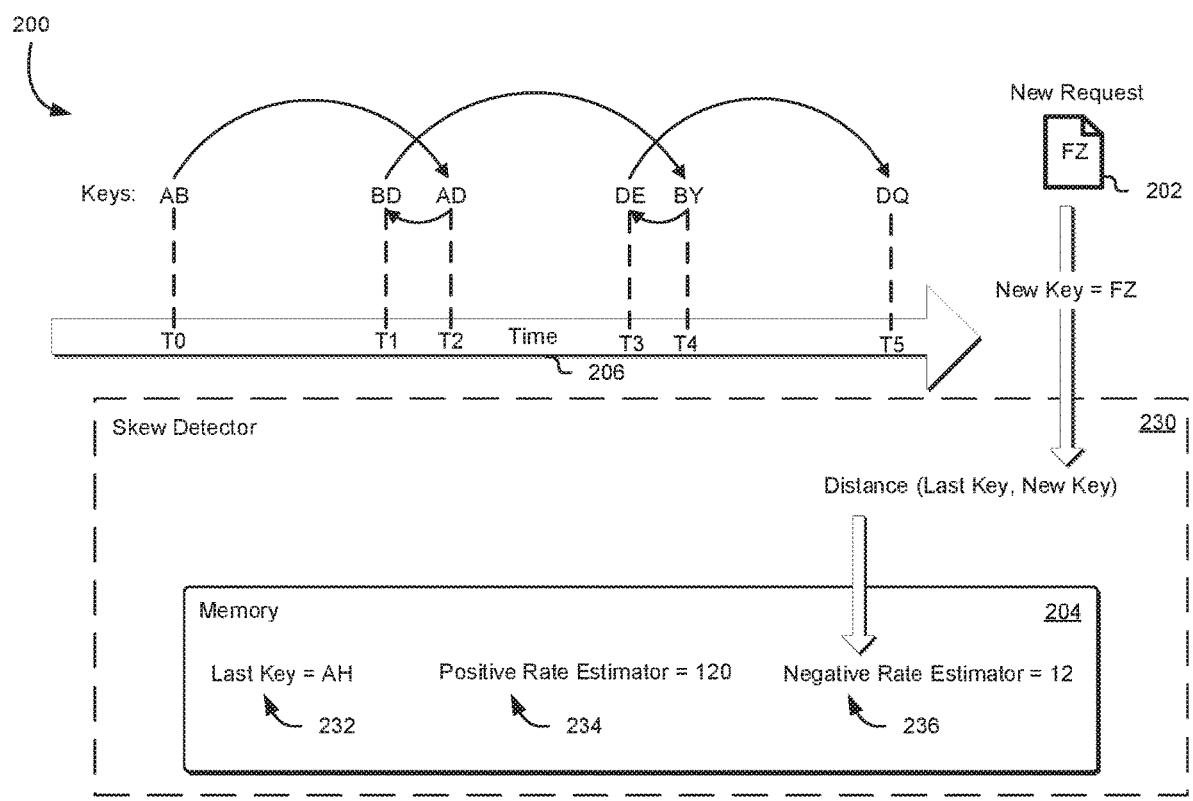
FIG. 2 is a diagram illustrating a skew detector in accordance with at least one embodiment.

FIG. 2 shows an illustrative example of a skew detector 230 in accordance with the present disclosure. The skew detector 230 may be executed by a data storage server (also referred to as a host computer system) as described above in connection with FIG. 1 and may store one or more values in the memory 204 of the data storage server. The skew detector 230 may provide a skew value for a set of keys, the skew value may indicate a direction and rate of change in at least a particular portion of keys included in the set of keys. For example, each key in the set of keys may have an initial portion of the key that is identical for all keys in the set. The initial portion may correspond to a prefix of the key used in locating data among partitions of the data storage service as described above. As illustrated by FIG. 2, the skew value may be calculated for the set of keys or a portion of the keys "AB," "CZ," "AD," EZ," "AF," "AH," and "FZ." The set of keys may be in a one-dimensional linear key space including two directions, which may be label positive and negative for illustrative purposes. The skew value for the set of keys may be tracked over a period of time 206.

The skew detector 230 may be configured such that between any two requests, the skew detector 230 may determine if the key included in the request is moving forward or backwards in a particular key space. The determination may be made on a key-by-key basis as the request including the keys are received and processed by the corresponding partition of the data storage service. In order to determine a skew value, an ordering of the keys in the key space may be detected. The skew detector may detect an ordering of the key by performing a comparison of the bytes between two or more keys. A variety of different ordering may be used so long as a relative distance between the keys may be determined. For example, the key may include a timestamp or an IP address as described above.

The skew detector 230 may also include one or more rate estimators, such as a positive rate estimator 234 and a negative rate estimator 236. The rate estimators may represent a weighted moving average of the keys included in the requests processed by the partition corresponding to the skew detector 230. In various embodiments, the rate estimators may be configured to represent an approximation of a weighted moving average based at least in part on a current value and a value representing at least one or the previous value. As described above, the rate estimators may be configured to decay exponentially over an interval. When a new request 202 is received, the skew detector may receive information corresponding to the key included in the request, the information may be any information suitable for calculating the distance between the key included in the new request and the last key 232 received. The distance may be calculated using a distance function as described above. The distance function may receive as an input the last key 232 and the new key obtained from the new request 202. As illustrated by FIG. 2, a distance between the new key "FZ" and the last key 232 "AH" may be calculated and the distance function may indicate a negative direction. The key may include any combination of numbers, symbols and letters and may be converted into one or more other formats for computational purposes. For example, the last key 232 and the new key may be converted to a binary format in order to enable to skew detector 230 to determine a distance between the two values. The arrows between the keys in FIG. 2 may indicate the direction of the distance between the two keys connected by the arrow. For example, the direction associated with the distance between the keys "AB" and "AD," as indicated by the arrow in FIG. 2, may be considered in the positive direction.

The skew value may indicate the movement of the keys in the key space in a particular direction despite the direction between any number of key pairs being in the opposite direction of the particular direction. Returning to the example above, a customer may include sequential user identification numbers in requests to the data storage service, the skew detector 230 may determine a skew value indicating the customer's progression through the space of sequential user identification numbers despite any intervening request including prior user identification numbers (e.g., user identification numbers that have been previously set up). Returning to FIG. 2, if the negative direction is indicated by the distance function, the absolute value of the determined distance between the new key and the last key 232 may be added to the negative rate estimator 236. Similarly, if the positive direction is indicated by the distance function, the absolute value of the determined distance between the new key and the last key 232 may be added to the positive rate estimator 234.

At any given point in time 206 the skew value may be determined by calculating the ratio of the positive rate estimator 234 and the negative rate estimator 236. As illustrated by FIG. 2, the skew detector 230 may determine the skew value by calculating the ratio of the positive rate estimator 234 and the negative rate estimator 236 or $^{120}/_{12}$. In this example, the ratio of 10 is indicative of the keys included in the request from the customer moving at a particular rate in the positive direction. The skew detector may then cause one or more mitigating actions to be performed based at least in part on the skew value as indicated by the calculated ratio. For example, the skew detector may cause a tracking service associated with the partition to turn off or otherwise disable certain optimizations based at least in part on a frequency associated with one or more prefixes of the key. Furthermore, the skew detector 230 could cause additional actions to be performed such as splitting a particular partition into a plurality of partitions and distributing requests randomly or non-randomly between the plurality of partitions. In various embodiments, the skew detector 230 is built into the tracking service such that a skew value is associated with each split point in the prefixes monitored by the tracking service. Furthermore, integrating the skew detector 230 with the tracking service may enable the partition to determine the skew value in a portion of the key beyond the prefix and reduce the portion of the key that may be tracked for the purposes of determining the skew value.

Figure 3:
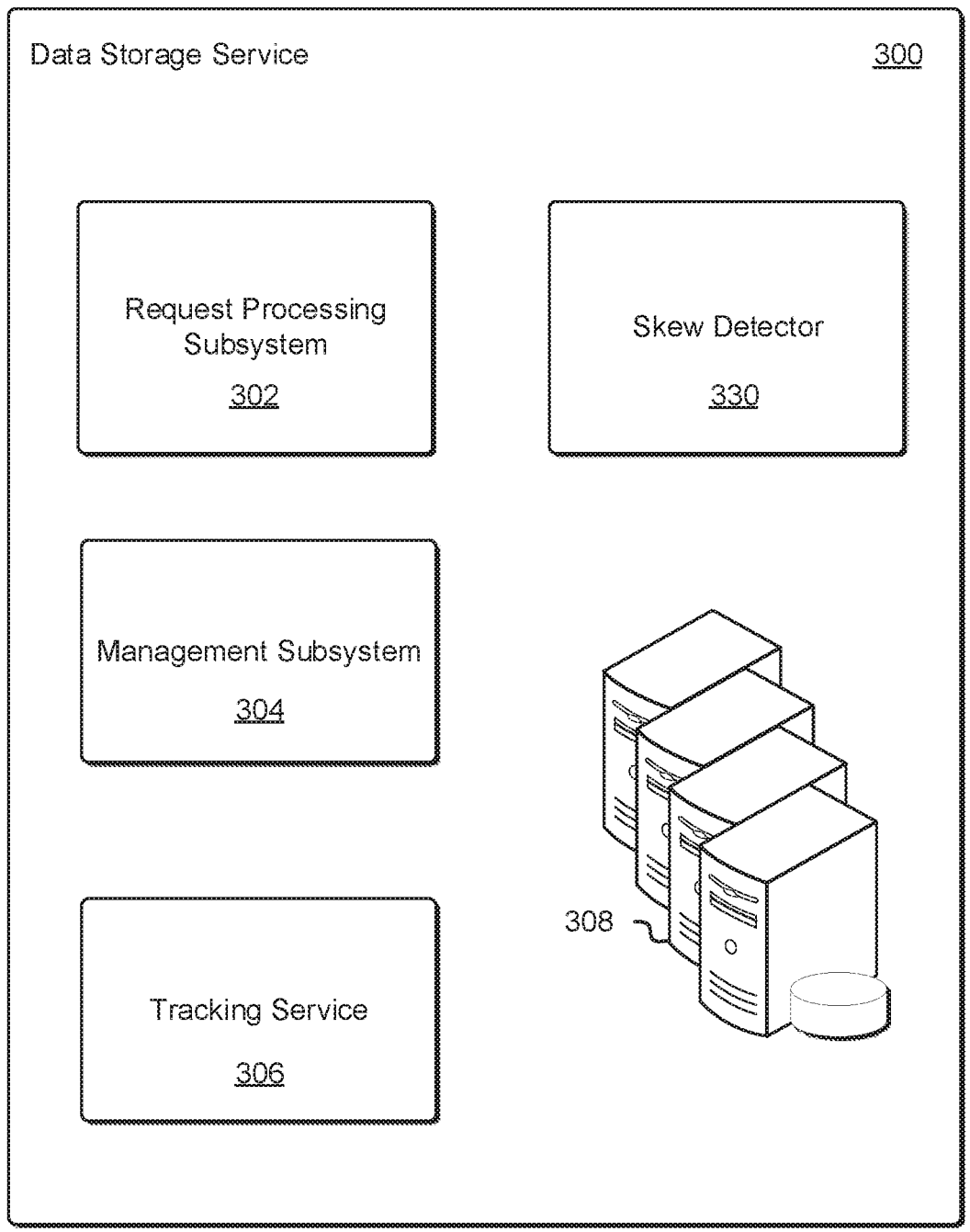
FIG. 3 is a diagram illustrating a data storage service in accordance with at least one embodiment.

FIG. 3 shows an illustrative example of a data storage service 300 in accordance with various embodiments. The data storage service 300 may be a service of a computing resource provider (also referred to simply as a service provider) used to operate a data storage service wherein user requests may be tracked in order to determine distribution of the requests among various resources of the service provider. As illustrated in FIG. 3, the data storage service 300 includes various subsystems such as a request-processing subsystem 302, a management subsystem 304, a tracking service 306 and a skew detection 330. The data storage service 300 may also include a plurality of data storage servers 308. In an embodiment, the request-processing subsystem 302 is a collection of computing resources, such as webservers and application servers, collectively configured to process requests submitted to the data storage service 300. The request-processing subsystem 302, for example, may include one or more webservers that provide a web service interface to enable customers of the data storage service 300 to submit requests to be processed by the data storage service 300. Furthermore, the request-processing subsystem 302 may receive requests to interact with data stored by the one or more data storage servers 308. The request-processing subsystem 302 may include computer systems configured to make various determinations in connection with the processing of requests, such as whether policy allows fulfillment of a request, whether requests are authentic (e.g., electronically signed using a suitable cryptographic key) and otherwise. The request-processing subsystem 302 may maintain a key-value store configured to locate data objects stored by the data storage service based at least in part on a key included in a request to interact with data objects.

Components of the request-processing subsystem may interact with other components of the data storage service 300 (e.g., through network communications). For example, some requests submitted to the request-processing subsystem 302 may involve the management of computing resources which may include data objects stored by the data storage servers 308. The request-processing subsystem 302, for example, may receive and process requests to modify computing resources. For instance, in some examples, data objects are logically organized into logical volumes (also referred to as logical data containers). Data objects associated with a logical data container may, for example, be said to be in the logical data container. Requests to the request processing subsystem 302 may include requests for creating logical data containers, deleting logical data containers, providing an inventory of a logical data container, providing or updating access control policy with respect to one or more logical data containers and the like.

The requests may be processed by the management subsystem 304 upon receipt by the request-processing subsystem 302. If applicable, various requests processed by the request-processing subsystem 302 and/or management subsystem 304 may result in the management subsystem 304 updating metadata associated with data objects and logical data containers stored in a metadata store. Other requests that may be processed by the request-processing subsystem 302 include requests to perform operations in connection with data objects. The requests, for example, may include requests to upload data objects to the data storage service 300, to download data objects from the data storage service 300, to delete data objects stored by the data storage service 300 and/or other operations that may be performed. The management subsystem may maintain information corresponding to the requests such as an average of the number of requests received over an interval associated with each data storage server, logical data container or storage partition.

Requests processed by the request-processing subsystem 302 that involve operations on data objects (upload, download, delete, e.g.) may include interaction between the request-processing subsystem 302 and one or more data storage servers 308. The data storage servers 308 may be computer systems communicatively coupled with one or more storage devices for the persistent storage of data objects. For example, in order to process a request to upload a data object, the request-processing subsystem may transmit data to a data storage server 308 for persistent storage. It is noted, however, that in some embodiments, client (e.g., customer) computer systems may transmit data directly to the data storage servers 308 instead of through servers in the request-processing subsystem.

In some embodiments, the request-processing subsystem 302 transmits data to multiple data storage servers 308 for the purpose of redundantly storing the data to allow the retrievability of data in the event of failure of an individual data storage server 308 and/or associated data storage device. For example, in some embodiments, the request-processing subsystem uses a redundancy in coding scheme such as erasure coding to deconstruct a data object into multiple parts that are stored among the data storage servers 308. The parts may be configured such that if access to a certain number of parts is lost, the data object may nevertheless be reconstructable from the remaining parts that remain accessible. Similarly, the data storage servers 308 may store the data in multiple partitions for the purpose of redundantly storing the data and improving the ability of the data storage service 300 to respond to requests. For example, the data storage server 308 may store a data object in multiple partitions each capable of fulfilling a request.

To enable efficient transfer of data between the request-processing subsystem 302 and the data storage servers 308 and/or generally to enable quick processing of requests, the request-processing subsystem 302 may include one or more databases that enable the location of data among the data storage servers 308. For example, the request-processing subsystem 302 may operate a key value store that serves to associate identifiers of data objects with locations among the data storage servers 308 for accessing data of the data objects. In an embodiment, the key value store uses prefixes of the keys included in the request to associate identifiers of data objects with locations among the data storage servers 308. Furthermore, the tracking service 306 may track or otherwise monitor requests to determine and/or predict distributed load between the data storage servers 308 and components thereof, such as the storage partitions.

The tracking service 306 may be computer systems configured to obtain request information from the request-processing system and track a number of prefixes that are more frequently included in requests than other prefixes. For example, the tracking service 306 may be a virtual computing system executing on computing resources of the service provided and connected to the various other components of the data storage service 300 over a network. The tracking service 306 may be a process or thread of another component of the data storage service 300. For example, the tracking service 306 may be a process of the storage partitions executed by the data storage servers 308. Furthermore, the tracking service 306 may be configured to track prefixes of keys in an arbitrary name space (also referred to as a key space). The user may be able to track data to the data storage service and specify a name for the data of any size, within the maximum size constraints, if any, enforced by the data storage service. Furthermore, the size of the key may vary between keys. For example, the user may define a directory and file name for data stored by the data storage service. The same directory may contain multiple files with varying file name lengths. The tracking service 306 may also track and/or determine potential split points and enable the management subsystem 304 to determine which prefixes to associate with new storage partitions that may be created to reduce loads on existing partitions and process requests.

The data storage service may include a repair service (not shown in FIG. 3 for simplicity). The repair service may be responsible for maintaining data stored in the data storage server 308 and ensuring that the storage partitions executed by the data storage service 308 contain the same data. The repair service may also transfer or copy data from a particular partition responsible for data associated with a prefix that is being split to a new partition responsible for data associated with the new split prefix. The skew detector 330 may be computer systems configured to determine a skew value in a set of keys. For example, the skew detector 330 may be a virtual computing system executing on computing resources of the service provider and connected to the various other components of the data storage service 300 over a network. The skew detector 330 may be a process or thread of another component of the data storage service 300 such as the tracking service 306. In another example, the skew detector 330 may be a process of the storage partitions executed by the data storage servers 308. Furthermore, the skew detector 330 may be configured to maintain data useable for determining the skew value in memory of the data storage servers 308.

Figure 4:
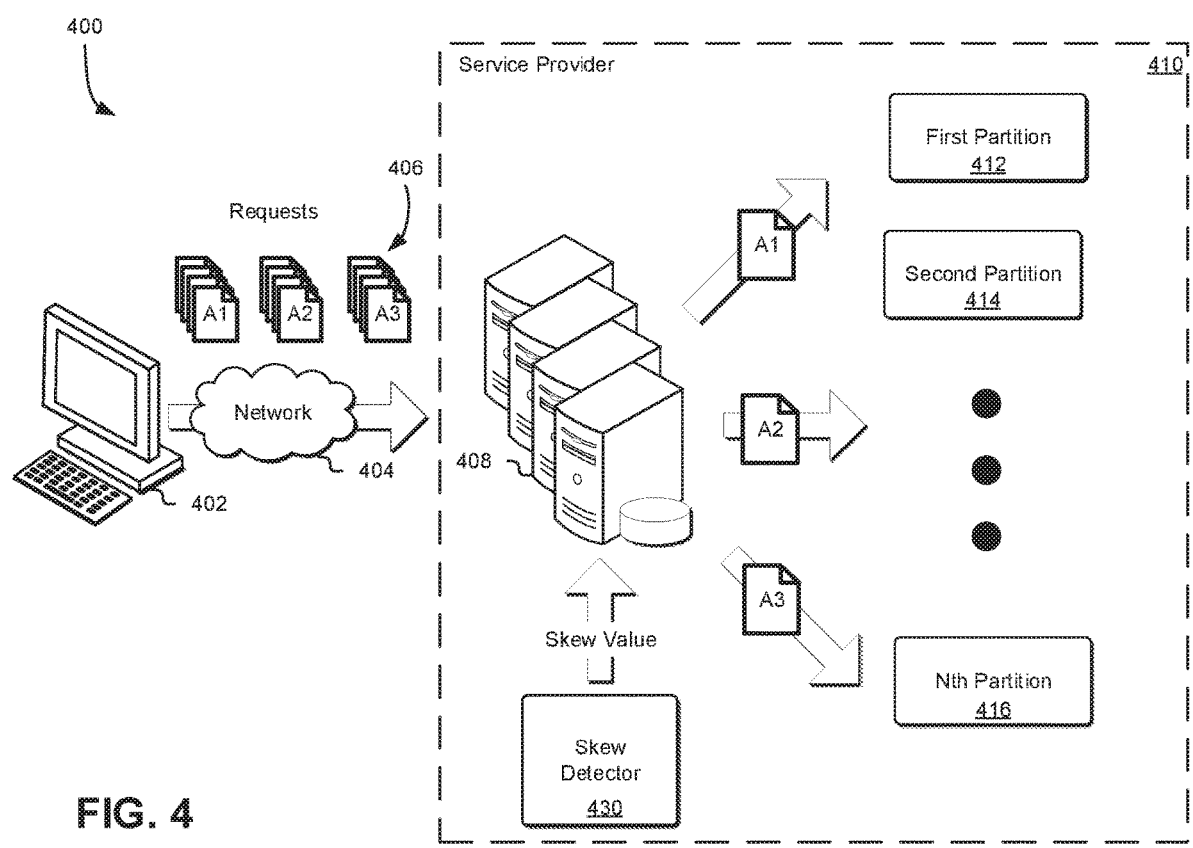
FIG. 4 is an environment illustrating request processing by a data storage service based at least in part on information provided by a skew detector in accordance with at least one embodiment.

FIG. 4 illustrates an example environment 400 where one or more computer systems running within a computing resource service provider environment, as well as the associated code running thereon, may perform a mitigating action based at least in part on a skew value obtained from a skew detector 430. A user 402 may connect to a data storage server 408 through a computer system client device and may initiate connection with and/or interaction with one or more storage partitions associated with the data storage server 408. The user 402 may transmit a request 406 including a key configured to identify the requested data over a network 404 as described above. The service provider 410 may operate a data storage service as described above in connection with FIG. 3. The data storage service may include a management subsystem configured to distribute load between the data storage servers 408 and the partitions by at least causing new partitions to be generated in order to process a certain number of requests 406. The data storage server 408 may execute one or more partitions including a first partition 412, a second partition 414, and an Nth partition 416. The storage partitions may be a computer system configured to store data associated with a particular key or prefix of a key. Storage partitions are described in greater detail below in connection with FIG. 5.

The management subsystem may periodically or aperiodically request information corresponding to potential split points in the key space and the skew value from the storage partitions. For example, each partition may track prefixes of keys included in requests 406 directed to the particular partition. In various embodiments, the management subsystem or other systems of the service provider 410 may check the skew value after the determination is made to split the prefix. If the skew value is above a threshold, the management subsystem or other systems of the service provider 410 may prevent the prefix from being split or may perform some other mitigating actions.

Other mitigation actions may include generating additional partitions to process requests as described above. The repair service may be responsible for transferring data associated with the new partition from the storage partition previously responsible for maintaining the data. For example, the repair service to copy data from the first partition 412 to the Nth partition 416. The first partition 412 may continue to fulfill request 406 until the repair process has completed operations. In various embodiments, the first partition 412 contains multiple data stores with at least some redundant information, the repair service then copies only the most recent data to the Nth partition 416 based at least in part on a time stamp corresponding to the data. Once the repair service has copied the information from the first partition 412 to the Nth partition 416, the repair service or other component of the service provider 410 may update the request-processing system such that the record contained in the key value store points to the Nth partition 416.

Figure 5:
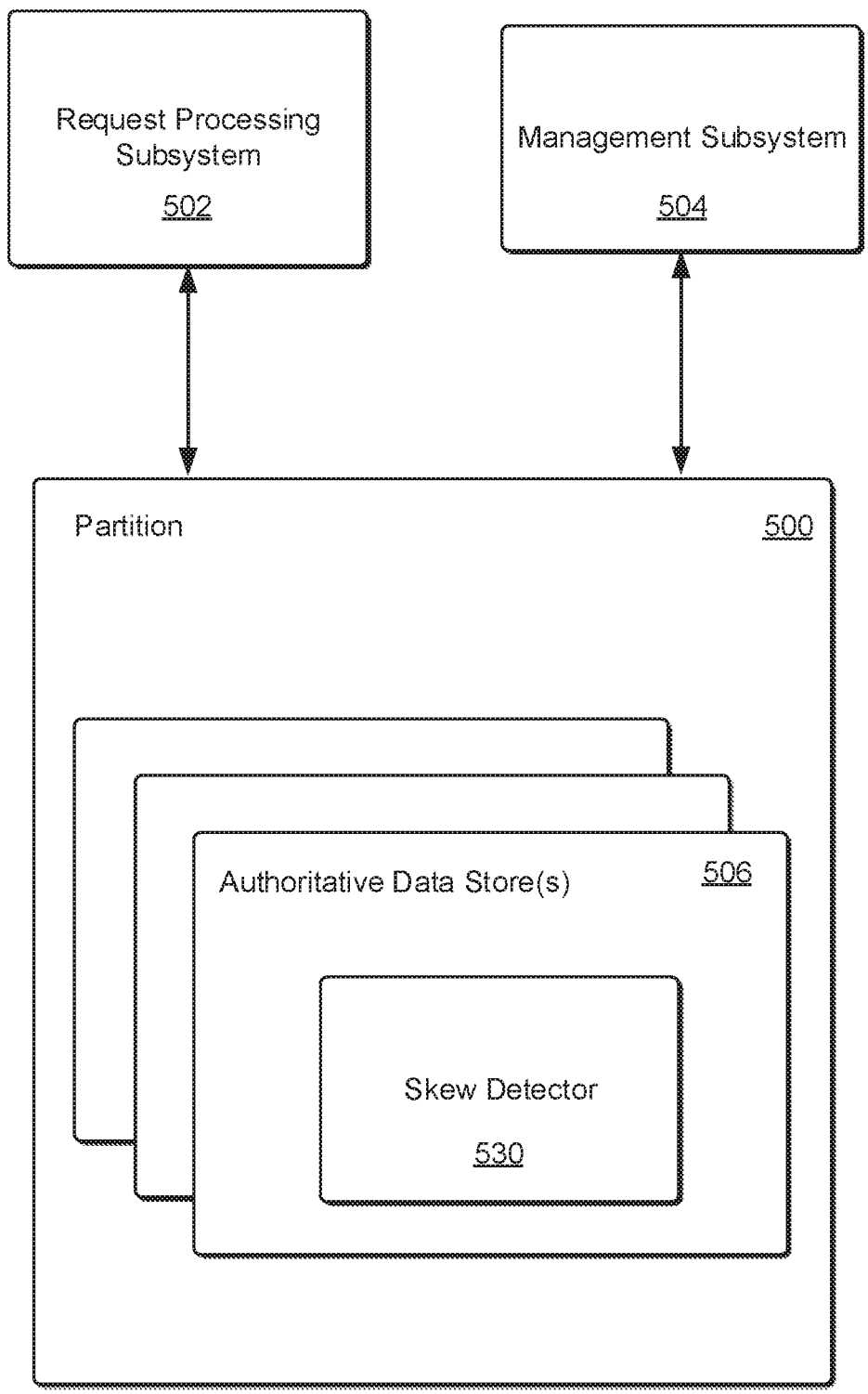
FIG. 5 is a diagram illustrating a data storage partition in accordance with at least one embodiment.

FIG. 5 shows an illustrative example of a storage partition 500 in accordance with various embodiments. The partition 500 may be a component of or executed by the data storage servers of the data storage service as described above in connection to FIG. 3. As illustrated in FIG. 5, the partitions 500 may include one or more authoritative data stores 506. Furthermore, the partition may be connected over a network to the request-processing subsystem 502 and the management subsystem 504 of the data storage service. The partition 500 may be a computer system configured to receive requests to store data and/or read stored data. For example, the partition 500 may be a virtual computer system executing one or more applications, which collectively are capable of reading and writing data from the one or more authoritative data stores 506. The authoritative data stores 506 may be a data storage system configured to store data in a logical container such as a logical volume. For example, the authoritative data stores 506 may be logical volumes corresponding to at least a portion of a physical hard drive of the data storage server executing the partition 500 and exposed to the partition 500 such that the partition may write and read data from the logical volume.

The partition 500 may also include a skew detector 530. The skew detector 530 may be a process or application of the partition 500 configured to track the moving average of the keys over an interval. The request-processing subsystem 502 may direct requests to the partition 500 based at least in part on the key included in the request and the key-value store indicating the particular partition 500 indicated by the key. The skew detector 530 may track the moving average as a rate estimator as described above in connection with FIG. 2. For each request received from the request-processing subsystem 502, the partition 500 may cause the authoritative data store 506 to fulfill the request and the skew detector 530 may determine a distance and a direction between the request and a previous request as described above in connection with FIG. 2. The skew detector 530 may also transmit information to the management subsystem 504. For example, the skew detector 530 may transmit an indication to the management subsystem 504 that the skew value is above a particular value in order to enable the management subsystem 504 to perform one or more mitigation actions.

Figure 6:
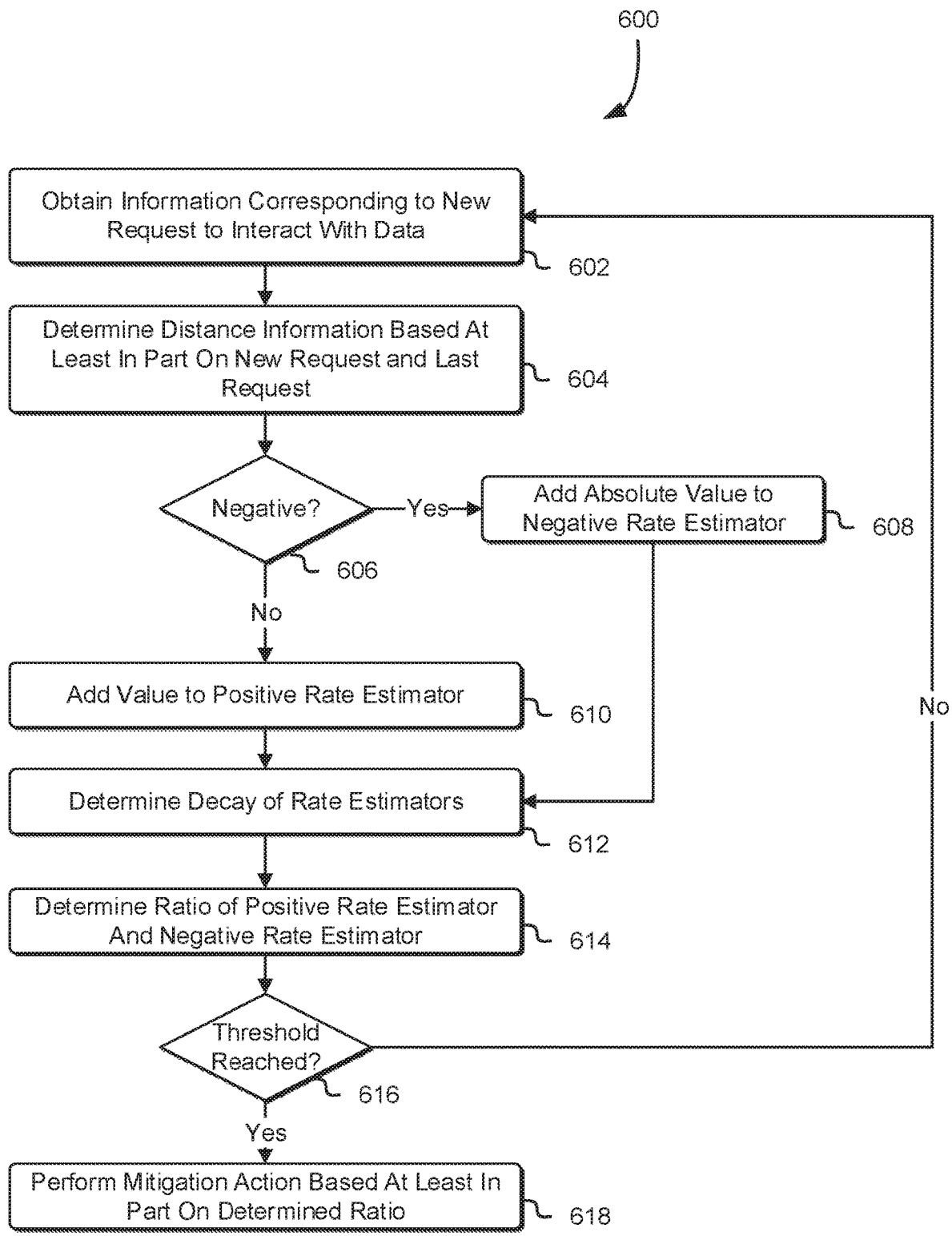
FIG. 6 is a process illustrating skew detection in accordance with at least one embodiment.

FIG. 6 shows an illustrative example of a process 600 which may be used to track a skew value associated with a set of keys and determine mitigating actions to be performed based at least in part on the skew value. The process 600 may be performed by any suitable system, such as by the data storage service as described in connection with FIG. 3. Returning to FIG. 6, in an embodiment, the process 600 includes obtaining information corresponding to a new request to interact with data 602. The request may be a request to store and/or retrieve data stored by a data storage service. The obtained information may include information suitable for determining distance information relative to one or more previous requests, such as the key or portion of the key as described above in connection with FIG. 2. A skew detector or other service of the data storage service may then determine distance information associated with the request based at least in part on information obtained from the new request and the last request 604. The information obtained from the last request may be stored in the memory of the host computer system performing process 600.

The distance information may include a direction and relative magnitude calculated by a distance function as described above in connection with FIG. 2. If the direction indicated by the distance function is negative 606 the absolute value of the distance calculated by the distance function may be added to the negative rate estimator 608. If the direction indicated by the distance function is not negative 606 the absolute value of the distance calculated by the distance function may be added to the positive rate estimator 610. A decay for the rate estimators may then be determined 612 and the rate estimators may be modified to include the determined decay. In numerous variations for the process 600, the decay for the rate estimators is determined when the particular rate estimator is accessed. The skew detector may then determine the ratio of the positive rate estimator and the negative rate estimator 614 in order to determine the skew value.

In numerous variations to process 600, the skew value is determined based at least in part on a request from another system of the data storage service such as the tracking service or management service. If the ratio is not above a threshold value 616, the process 600 may continue and adjust the rate estimators when new information is obtained for another new request. If the ratio is above the threshold value 616 the management service or other service of the data storage service may perform one or more mitigating actions based at least in part on the determined ratio 618. For example, the mitigating actions may include preventing the splitting or a prefix associated with the request to interact with data or allocating additional computing resource for processing requests to interact with data. In another example, the mitigating actions may include determining one or more alternate partitioning schema capable of more efficiently distributing load on the partitions of the data storage service based at least in part on the skew value. For example, hash partitioning schema may be used to distribute load between the partitions where request to interact with data objects are distributed between the partitions based at least in part on a hash of the key included in the request. Various other partitioning schemas may be used to account for the skew value determined based at least in part on the keys included in the request to interact with data objects stored within the data storage service.

Figure 7:
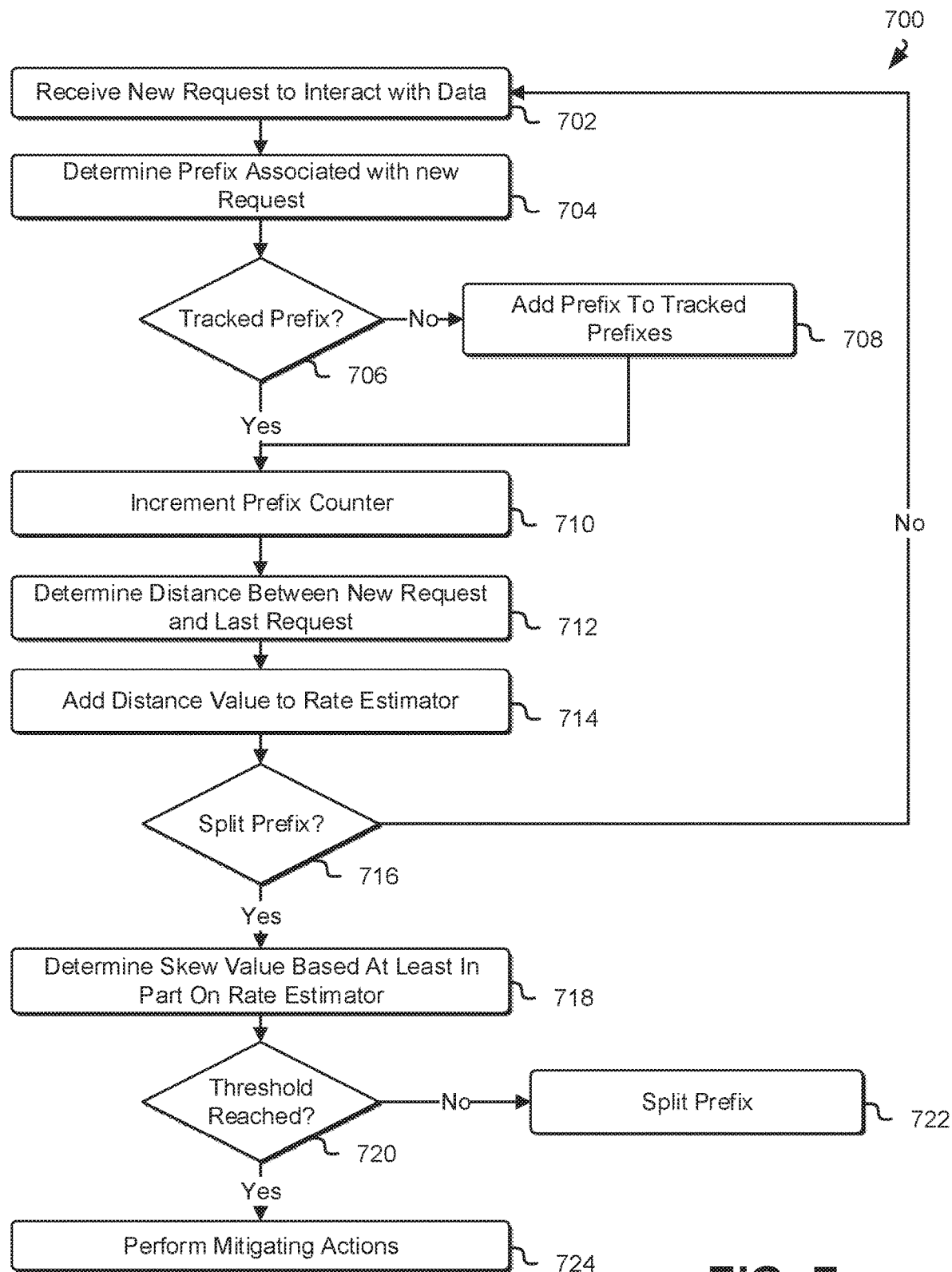
FIG. 7 is a process illustrating request processing using skew detection in accordance with at least one embodiment.

FIG. 7 shows an illustrative example of a process 700 which may be used to track prefixes of keys indicating the location of data in a data storage service and determining split points in the prefixes in order to take mitigating actions if a skew value is below a threshold. The process 700 may be performed by any suitable system, such as by the data storage service as described in connection with FIG. 3. Returning to FIG. 7, in an embodiment, the process 700 includes receiving a new request to interact with data 702. The new request may be a request described above or may include a request suitable for enabling a user to interact with data stored remotely with a service provider. The new request may include a key or a portion of a key indicating the location of the data. The new request may be received at the request-processing subsystem of the data storage service and the request-processing subsystem may determine a prefix associated with the request 704. The prefix may indicate a partition and a storage server indicated by the key as the location of the data. The request-processing system may then direct the request to the particular partition indicated by the prefix included in the request.

Once received by the partition, the tracking service may determine if the prefix is currently being tracked 706. Prefixes may be tracked in the memory of the partition as a collection or order list. The tracking service may track a certain number of prefixes; if the maximum number of tracked prefixes is reached, the tracking service may temporarily track received prefixes that are not already part of the collection of tracked prefixes in order to determine if the received prefixes are included in requests at a higher frequency than one or more of the tracked prefixes currently included in the collection of tracked prefixes. For example, if the prefix is not in the collection of tracked prefixes, the tracking service may add it to the collection of tracked prefixes 708. The tracking service may then increment a prefix counter associated with the prefix 710. However, if the prefix is already included in the collection of tracked prefixes, the tracking service may simply increment the prefix counter 710. Furthermore, the prefix counter may be configured to decay over time such as by using an exponential decay curve as described above.

Once the prefix counter has been incremented 710, the skew detector or some other service of the computer system of the service provider, such as the tracking service, may determine a distance value between the new request and a last request 712. The distance may be calculated by comparing the keys included in the requests as described above in connection with FIG. 2. The distance value may then be added to a rate estimator 714. The rate estimator may indicate a relative movement of the keys in the key space. For example, if the keys include information corresponding to time, the rate estimator may indicate the movement of the key forward in time. The tracking service may also determine whether to split 716 a particular prefix based at least in part on the counter and/or the skew value. Splitting the prefix 716 may include incrementing the prefix length to include additional key space elements that may be used to indicate the location of the new partition associated with the split prefix. If the tracking service determines not to split 716 the prefix, the host computer system executing the process 700 may continue to receive requests and determine split points and skew values based at least in part on the received requests.

If the tracking service or other service of the data storage service determine to split the prefix 716, the skew detector may determine a skew value base at least in part on the rate estimator 718. As described above, the skew detector may determine a skew value based at least in part on the ratio of one or more rate estimators. For example, the ratio of two rate estimators, one for each direction in a one-dimensional key space, may indicate the skew value for the set of keys included in the rate estimators. The skew detector may then provide the skew value to the management service and the management service may determine if a threshold 720 value for the skew value has been reached. The threshold 720 may correspond to the skew value indicative of the rate of progression in the key space that may not be efficiently processed by one or more split prefixes. For example, the threshold 720 may be a particular value of the skew value that, if reached, may cause the management subsystem to prevent new partitions to be generated based at least in part on one or more split points associated with a particular key.

If the threshold 720 is not reached, the prefix may then be split 722. Splitting the prefix may include generating a new partition, copying data corresponding to a new prefix to the new partition and processing requests corresponding to the new prefix from the new partition. If the threshold 720 is reached the data storage service or a component of the data storage service, such as the management subsystem, may then determine one or more mitigating actions 724 to take in response. Mitigating actions may include generating a new partition for processing requests associated with keys that may be used by customers in the future as indicated by the skew value, throttling or otherwise limiting the number of requests that may be submitted, redirecting traffic to a redundant data storage service for request processing or another action suitable for mitigating the load generated by request frequency.

Figure 8:
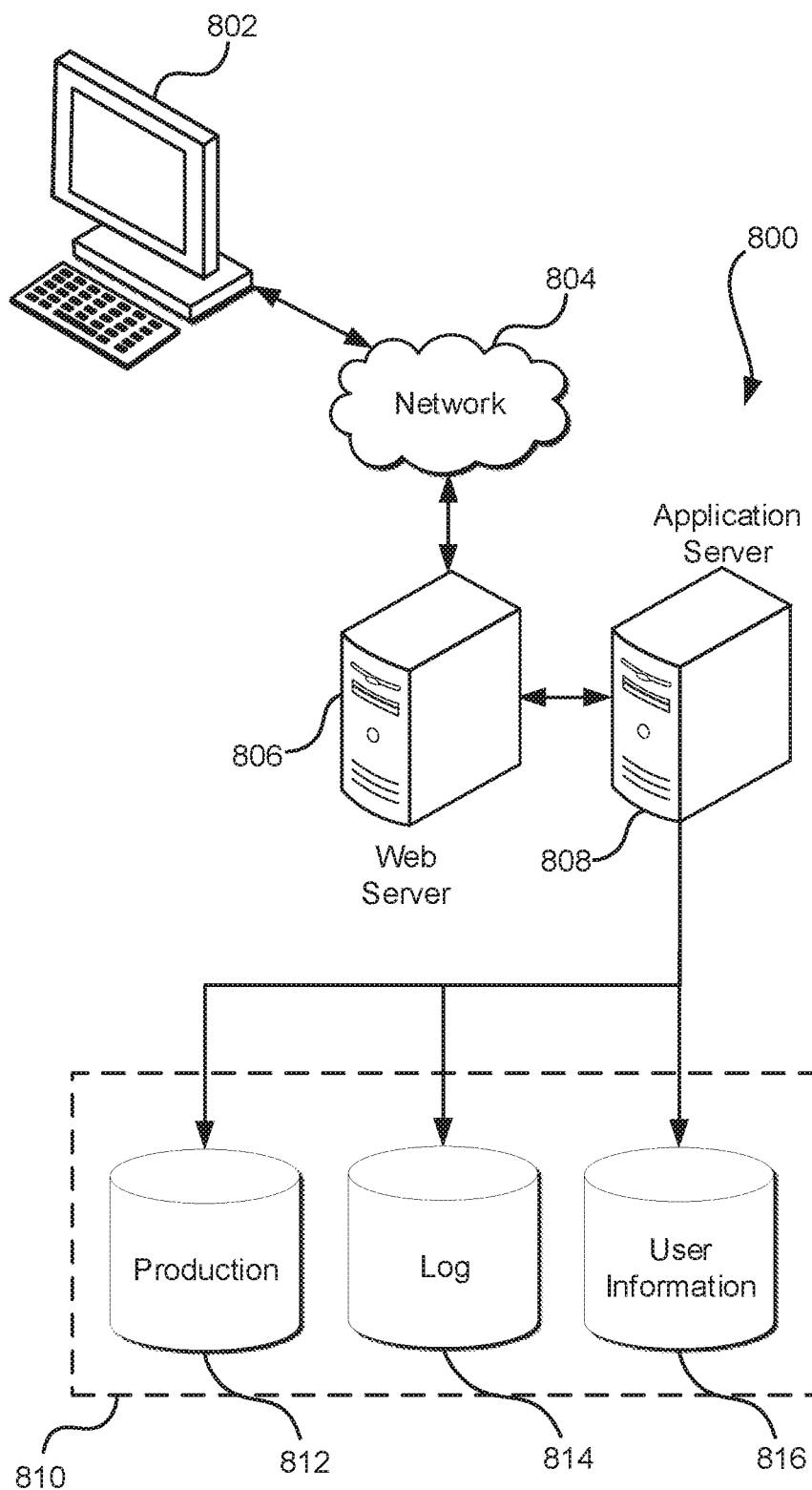
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("S1") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CG") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system, comprising:
   one or more processors; and
   memory with instructions that, upon execution by the one or more processors, cause the system to:
   for a sequence of requests specifying keys that identify one or more data objects stored in a set of storage partitions connected to a network:
   calculate a first measure of negative movement of the keys between requests;
   calculate a second measure of positive movement of the keys between requests;
   calculate a skew value based at least in part on the first measure and the second measure; and
   update a configuration of the set of storage partitions based at least in part on the skew value.

2. The system of claim 1, wherein the memory further includes instructions that, upon execution by the one or more processors, as a result of determining that the skew value is above a threshold, cause the system to perform a mitigating action that prevents a storage partition associated with a key space from being split by the system.

3. The system of claim 1, wherein the instructions that cause the system to calculate the skew value further cause the system to calculate the skew value using a moving average based at least in part on the first measure, the second measure, and a key value specified by a previous request in the sequence.

4. The system of claim 1, wherein the memory further includes instructions that, upon execution by the one or more processors, cause the system to:
   determine an additional dimension of a key space for which a distance between the keys can be calculated;
   calculate, for the additional dimension, a third measure of movement and a direction based at least in part on the keys;
   update a rate estimator associated with the additional dimension by at least the third measure of movement and the direction; and
   determine the skew value based at least in part on the rate estimator.

5. The system of claim 4, wherein the rate estimator is configured to decay exponentially over a period of time.

6. The system of claim 5, wherein the memory further includes instructions that, upon execution by the one or more processors, cause the system to calculate a decay value of the rate estimator in response to a last interaction with a partition, where the decay value is based at least in part on a timestamp corresponding to a previous interaction with the partition.

7. The system of claim 1, wherein the memory further includes instructions that cause the system to generate a request for the skew value based at least in part on a counter value associated with a prefix of the keys being above a threshold value.

8. The system of claim 1, wherein the memory further includes instructions that, upon execution by the one or more processors, cause the system to:
determine that the skew value exceeds a threshold value; and
perform one or more mitigation actions comprising:
determining at least one other alternative partitioning schema such that requests are directed to the set of storage partitions based at least in part on a hash value of a particular key of a key space; and
generating a second set of storage partitions, wherein at least a subset of the second set of storage partitions is configured to fulfill requests to interact with the one or more data objects based at least in part on the hash value.

9. A computer-implemented method, comprising:
for a sequence of requests associated with keys that identify one or more data objects stored in a set of storage partitions connected to a network:
calculating a first measure of negative movement of the keys between requests;
calculating a second measure of positive movement of the keys between requests;
calculating a skew value based at least in part on the first measure and the second measure; and
updating a configuration of the set of storage partitions based at least in part on the skew value.

10. The computer-implemented method of claim 9, wherein the computer-implemented method further comprises:
maintaining a counter for each of the set of storage partitions indicating a number of storage requests; and
as a result of the counter exceeding a counter threshold of storage requests for a particular storage partition over an interval of time, splitting the particular storage partition.

11. The computer-implemented method of claim 9, wherein the computer-implemented method further comprises, as a result of determining that the skew value exceeds a threshold, preventing a storage partition associated with a key space from being split.

12. The computer-implemented method of claim 9, wherein:
the computer-implemented method further comprises maintaining a plurality of rate estimators for each of the set of storage partitions, wherein the plurality of rate estimators provide a moving average; and
the skew value is calculated based at least in part on the moving average.

13. The computer-implemented method of claim 12, wherein the configuration specifies that the plurality of rate estimators decay over time.

14. A non-transitory computer-readable storage medium comprising executable instructions that, upon execution by one or more processors of a computer system, cause the computer system to at least:
for a sequence of requests specifying keys of a set of keys that identify one or more data objects stored in a set of storage partitions connected to a network:
calculate a first measure of negative movement of the keys between requests;
calculate a second measure of positive movement of the keys between requests;
calculate a skew value based at least in part on the first measure and the second measure; and
update a configuration of the set of storage partitions based at least in part on the skew value.

15. The non-transitory computer-readable storage medium of claim 14, wherein the executable instructions further comprise instructions that further cause the computer system to, as a result of a determination that the skew value exceeds a threshold, generate an additional storage partition.

16. The non-transitory computer-readable storage medium of claim 14, wherein the executable instructions further comprise instructions that, as a result of execution by the one or more processors of a computer system, cause the computer system, upon a determination that the skew value exceeds a threshold, to perform a mitigating action.

17. The non-transitory computer-readable storage medium of claim 16, wherein the mitigating action includes preventing the computer system from splitting a storage partition associated with a key space.

18. The non-transitory computer-readable storage medium of claim 16, wherein the executable instructions that cause the computer system to perform the mitigating action include instructions that cause the computer system to:
generate a set of new storage partitions wherein at least a subset of the set of new storage partitions is associated with a particular key of the set of keys;
copy data associated with the set of keys to the set of new storage partitions; and
distribute an additional request to the set of new storage partitions based at least in part on the skew value and a key of the set of keys included in the additional request.

19. The non-transitory computer-readable storage medium of claim 14, wherein a first key of the set of keys is of a different size from a second key of the set of keys.

20. The non-transitory computer-readable storage medium of claim 14, wherein a request of the sequence of requests includes an identifier of a key of the set of keys, a subset of bits of the identifier being associated with a storage partition of the set of storage partitions.

\* \* \* \* \*